(12) United States Patent
Frey

(10) Patent No.: US 7,259,476 B2
(45) Date of Patent: Aug. 21, 2007

(54) DC AND AC UNINTERRUPTIBLE POWER SUPPLY

(75) Inventor: Wilfred Frey, Kelowna (CA)

(73) Assignee: Always "On" UPS Systems Inc., Kelowna, British Columbia ( * ) Notice: Subject to any disclaimer, the term of this patent is extended or adjusted under 35 U.S.C. 154(b) by 305 days.

(21) Appl. No.: 11/114,075

(22) Filed: Apr. 26, 2005

(65) Prior Publication Data

US 2006/0238031 A1    Oct. 26, 2006

(51) Int. Cl.
H02J 7/00 (2006.01)
H02J 3/00 (2006.01)
H02M 5/40 (2006.01)
G05F 1/14 (2006.01)

(52) U.S. Cl. .................... 307/64; 307/17; 307/66; 363/34

(58) Field of Classification Search ............ 363/34, 363/37, 50, 55, 56.01, 65, 71; 320/137, 138; 307/17–29, 38, 39, 45, 46, 48, 64–66, 72–75, 307/80, 85, 88
See application file for complete search history.

(56) References Cited

U.S. PATENT DOCUMENTS

| | | | |
|---|---|---|---|
| 4,860,185 A | 8/1989 | Brewer et al. | |
| 5,721,675 A | 2/1998 | Lee | |
| 5,856,712 A * | 1/1999 | Suzuki et al. | 307/64 |
| 6,175,511 B1 | 1/2001 | Ooba | |
| 6,212,081 B1 * | 4/2001 | Sakai | 363/71 |
| 6,288,916 B1 * | 9/2001 | Liu et al. | 363/37 |
| 6,348,782 B1 * | 2/2002 | Oughton et al. | 323/284 |
| 6,400,043 B1 | 6/2002 | Batson et al. | |
| 6,459,604 B1 | 10/2002 | Yoon et al. | |
| 6,703,796 B2 | 3/2004 | Che-Chen et al. | |
| 6,753,622 B2 * | 6/2004 | Oughton, Jr. | 307/64 |
| 7,053,502 B2 * | 5/2006 | Aihara et al. | 307/46 |
| 7,148,586 B2 * | 12/2006 | Lee et al. | 307/65 |

* cited by examiner

*Primary Examiner*—Matthew V. Nguyen
(74) *Attorney, Agent, or Firm*—Oyen Wiggs Green & Mutala; Richard A. Johnson

(57) ABSTRACT

A power supply for point-of-sale (POS) devices. The power supply comprises a transformer with first through fourth windings. An AC input is connected through a backfeed relay to the first winding. An AC output is also connected to the first winding. A battery and an inverter are connected to the second winding. A charger is connected to the third winding. A rectifier, DC/DC regulator and a DC output are connected to the fourth winding. When AC power is received at the AC input, the AC output and the transformer receive the AC power through the backfeed relay. The DC output receives DC power through the DC/DC regulator and the rectifier, which receives AC power through the transformer. When AC power is not received at the AC input, the battery and the inverter provide AC power to the transformer, and the AC output and the rectifier receive AC power from the transformer. The DC output receives DC power through the DC/DC regulator and the rectifier.

17 Claims, 2 Drawing Sheets

DC AND AC UNINTERRUPTIBLE POWER SUPPLY

TECHNICAL FIELD

The invention relates to uninterruptible power supplies, and particularly to uninterruptible power supplies which provide both direct and alternating current power outputs.

BACKGROUND

An uninterruptible power supply (UPS) is an apparatus connected between a power source and a device to prevent outages and "spikes" of the power source from adversely affecting the performance of the device. A UPS has an internal battery to ensure that continuous power is provided to the device even if power from the power source is interrupted. A UPS typically provides backup battery power for at least several minutes, which in most cases is long enough to power the device until power from the power source is reestablished.

A UPS is of particular importance for point-of-sale (POS) systems. A UPS can protect an otherwise vulnerable POS system against brief power disturbances during retail transactions. A shutdown of a POS system not only inconveniences waiting customers, but also threatens the integrity of data (price, inventory, promotions, etc.) collected by modern POS systems. Modern POS systems often support several peripheral devices including, for example, printers, scanners, credit card/debit card terminals, all of which may be damaged during power fluctuations and outages.

There exist UPS systems for use in POS environments which provide only alternative current (AC) power. This can be problematic because some POS devices, such as printers, often require direct current (DC) power, and thus cannot be protected by available UPS systems.

There is a need for POS UPS systems that output both AC and DC power.

SUMMARY OF THE INVENTION

One aspect of the invention relates to a power supply for providing alternating current (AC) and direct current (DC) to a plurality of loads. The power supply comprises a transformer having first, second, third and fourth windings. An AC input for receiving AC power from an external source is connected across the first winding through a backfeed relay. An AC output is also connected across the first winding, and is connected to the AC input through the backfeed relay. An inverter is connected across the second winding. A pair of battery terminals are connected between the inverter and a center tap of the second winding. A charger is connected across the third winding. The charger is coupled to the pair of battery terminals. A rectifier is connected across the fourth winding. A DC output connected to the rectifier through a DC/DC regulator. A controller is coupled to the AC input, the backfeed relay, the inverter and the charger. When AC power is received at the AC input the power supply operates in a normal mode wherein the controller closes the backfeed relay such that the AC output receives AC power from the AC input through the backfeed relay, the rectifier receives AC power from the AC input through the backfeed relay and the transformer, and, the DC output receives DC power from the rectifier through the DC/DC regulator. When AC power is not received at the AC input the power supply operates in a backup mode wherein the controller opens the backfeed relay and causes the inverter to operate in push-pull fashion such that DC power received at the pair of battery terminals is converted to AC power and provided to the second winding through the inverter, the AC output receives AC power through the transformer, the rectifier receives AC power through the transformer, and, the DC output receives DC power from the rectifier through the DC/DC regulator.

Further aspects of the invention and features of specific embodiments of the invention are described below.

BRIEF DESCRIPTION OF THE DRAWINGS

In drawings which depict non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The present invention relates to an uninterruptible power supply (UPS) for point-of-sale (POS) devices. The power supply comprises a transformer with first through fourth windings. An AC input is connected through a backfeed relay to the first winding. An AC output is also connected to the first winding. A battery and an inverter are connected to the second winding. A charger is connected to the third winding. A rectifier, DC/DC regulator and a DC output are connected to the fourth winding. When AC power is received at the AC input, the AC output and the transformer receive the AC power through the backfeed relay. The DC output receives DC power through the DC/DC regulator and the rectifier, which receives AC power through the transformer. When AC power is not received at the AC input, the battery and the inverter provide AC power to the transformer, and the AC output and the rectifier receive AC power from the transformer. The DC output receives DC power through the DC/DC regulator and the rectifier.

Figure 1:
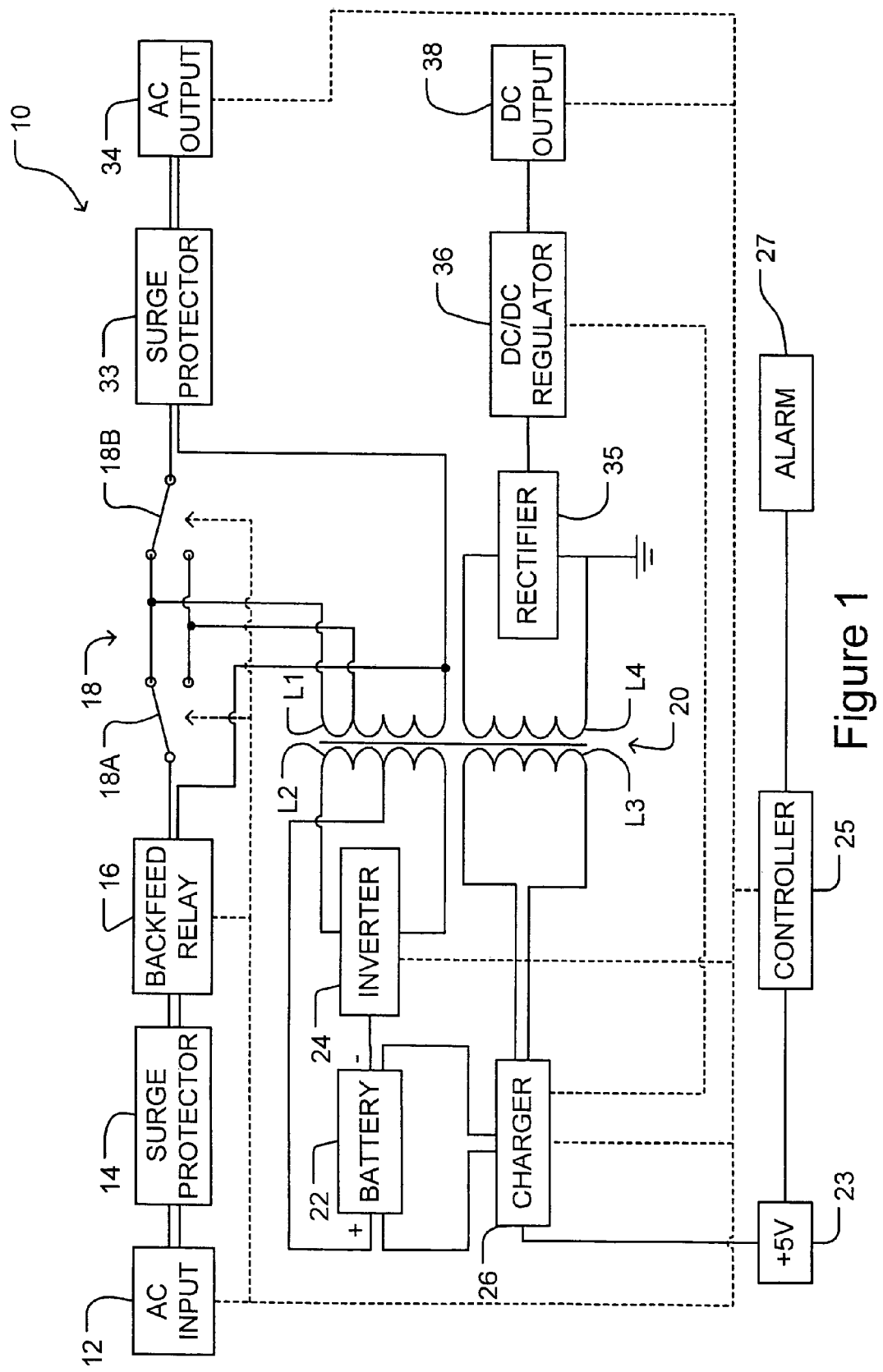
FIG. 1 schematically illustrates a power supply according to one embodiment of the invention.

FIG. 1 shows a power supply 10 according to one embodiment of the invention. Power supply 10 receives AC power from an external AC power source (not shown) at AC input 12. The power source may, for example, supply 120 V or 220 V of AC power at 50 or 60 Hz. The power source may, for example, be a wall unit connected to a power utility. AC input 12 is coupled to a transformer 20 through a backfeed relay 16. An AC output 34 is also coupled to backfeed relay 16. Surge protectors 14, 33 may optionally be connected to AC input 12 and AC output 34.

Transformer 20 comprises first through fourth windings L1, L2, L3 and L4 wrapped around a common core. The core of transformer 20 may comprise, for example, a metallic core. AC input 12 is connected across first winding L1 through backfeed relay 16. AC output 34 is also connected across first winding L1.

Voltage regulation relays 18 may be connected to first winding L1 to allow power supply 10 to accommodate fluctuations in the voltage of power received at AC input 12 from the external power source. Voltage regulation relays 18 comprise an input voltage regulation relay 18A and an output voltage regulation relay 18B. A first terminal of backfeed relay 16 is connected to a first end tap of first winding L1. A first terminal of AC output 34 is also connected to the first end tap of first winding L1. Input voltage regulation relay 18A is connected between a second terminal of backfeed relay 16 and first winding L1. Output voltage regulation relay 18B is connected between a second terminal of AC output 34 and first winding L1. Input voltage regulation relay 18A and output voltage regulation relay 18B each have a first position and a second position. The first positions of input and output voltage regulation relays 18A and 18B are connected to a second end tap of first winding L1. The second positions of input and output voltage regulation relays 18A and 18B are connected to an intermediate tap of first winding L1. The intermediate tap of first winding L1 may be located such that there are about 75% as many turns between the intermediate tap and the first end tap as there are between the second end tap and the first end tap.

An inverter 24 is connected across (i.e., connected to the end taps of) second winding L2. A pair of battery terminals connected to a battery 22 are connected between inverter 24 and a center tap of second winding L2. Alternatively, power supply 10 may not include a battery, and comprise a pair of battery terminals configured to receive a battery.

A charger 26 is connected across third winding L3. Charger 26 is coupled to the pair of battery terminals for charging battery 22. Charger 26 is also configured to provide DC power to a +5V power source 23 coupled to a controller 25. Controller 25 may be connected to an alarm 27. Controller 25 is coupled to AC input 12, backfeed relay 16, voltage regulation relays 18, inverter 24, charger 26, AC output 34 and DC output 38, as indicated by the dashed lines in FIG. 1, and is configured to control the operation of power supply 10, as described below. Controller 25 may comprise, for example, a microprocessor programmed with software for controlling the operation of power supply 10.

A rectifier 35 is connected across fourth winding L4. Rectifier 35 is grounded, and connected to provide DC power to a DC/DC regulator 36. DC/DC regulator 36 is configured to provide a steady output of DC power at a DC output 38. For example, the DC power provided to DC output 38 may be +24 volts at 1.5 amperes, which meets the power requirements of typical point of sale devices such as printers. A plurality of loads (not shown) may be connected to AC output 34 and DC output 38, such that the loads can draw power from battery 22 in the event of a problem with the external AC power source.

The number of turns in first through fourth windings L1, L2, L3 and L4 may be selected based on the nominal voltage of the AC power, the voltage of battery 22, and the voltage required by DC output 38. For example, if the nominal voltage of the AC power is 120V, and the voltage required by DC output 38 is +24V, first winding L1 may have five times as many turns as fourth winding L4.

Figure 3:
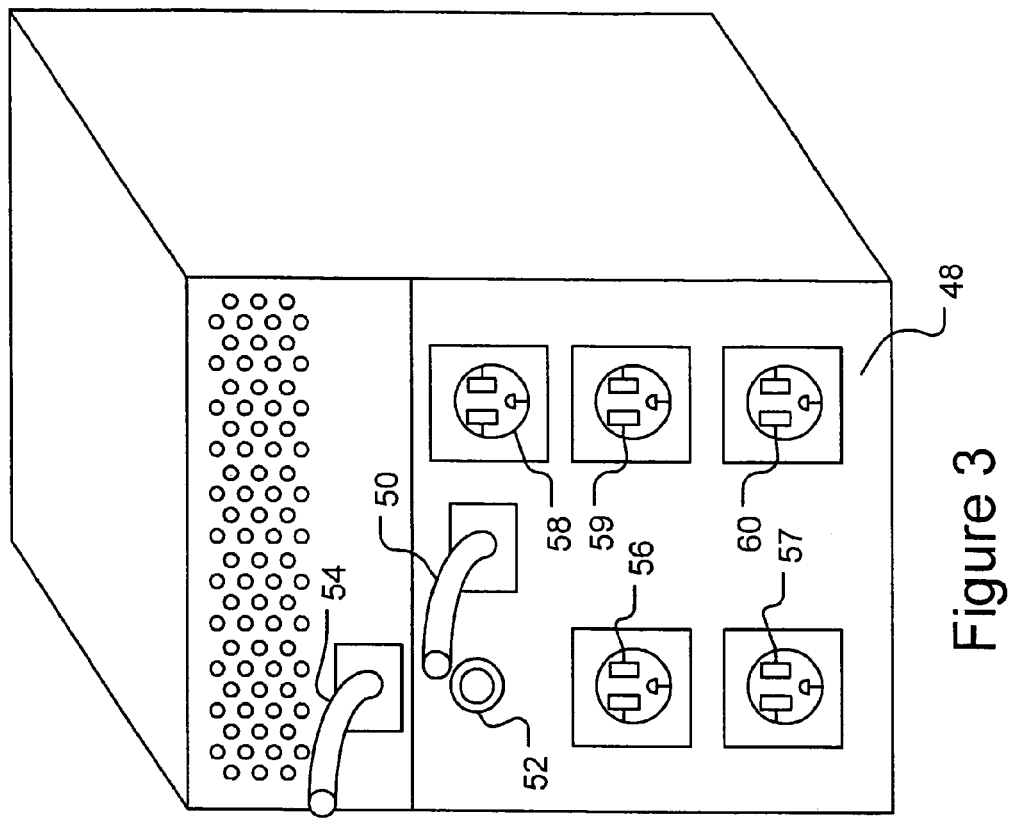
Figure 2:
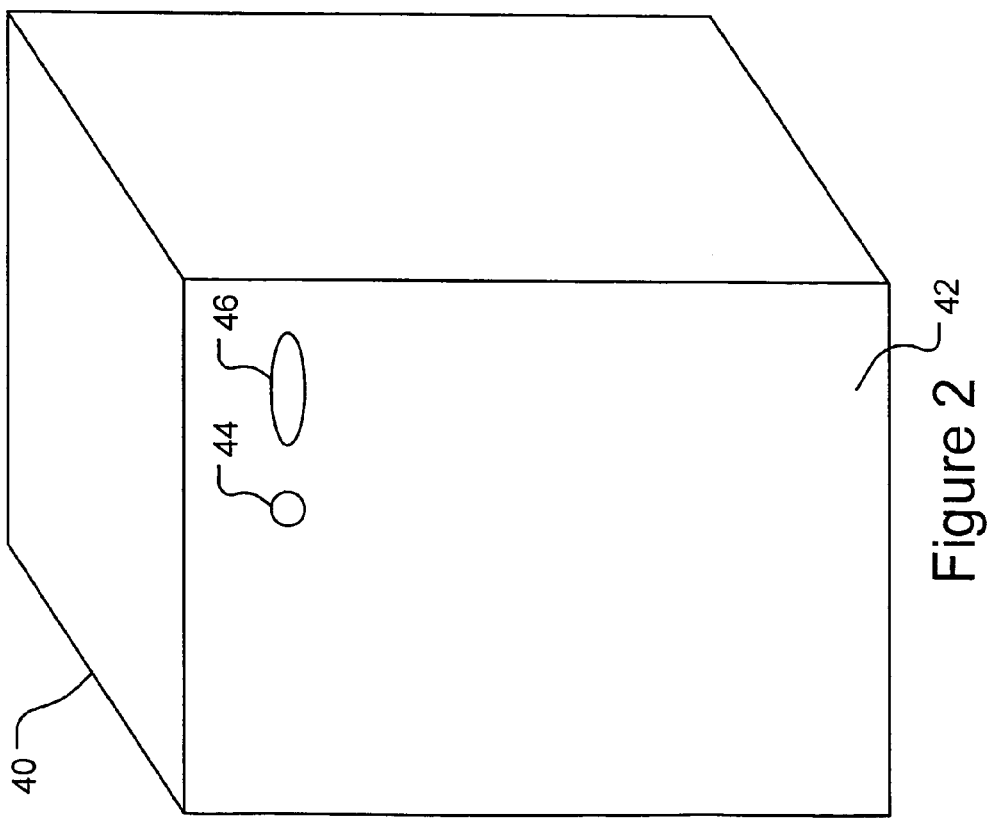
FIG. 2 is a front view of a power supply in a housing according to another embodiment of the invention; and, FIG. 3 is a rear view of the power supply of FIG. 2.

FIGS. 2 and 3 respectively show front and rear views of a housing 40 which houses power supply 10 according to one embodiment of the invention. Housing 40 has a front panel 42, as shown in FIG. 2, with a light emitting diode (LED) 44 and a control button 46 thereon. LED 44 is continuously illuminated when power supply 10 is receiving AC power from the external source and operating properly. LED 44 flashes every two seconds when power supply 10 is providing power to the connected loads from battery 22. LED 44 flashes rapidly when battery 22 should be replaced.

A user may turn power supply 10 on or off by pressing button 46 and holding it for at least 3 seconds.

FIG. 3 shows a back panel 48 of housing 40. Back panel 48 comprises an AC input cable 50, and AC input breaker 52, a DC output cable 54, and AC outlets 56-60. AC input cable 50 is used to connect the external AC power source to AC input 12 (see FIG. 1) through breaker 52, so that power supply 10 is protected from power overloads and short circuits. DC output cable 54 is connected to DC output 38. Some of AC outlets 56-60 are connected to AC output 34 such that they can receive backup power from battery 22 (see FIG. 1), while some are connected to AC input cable 50 only through a surge protector (not shown) and are not backed up.

Breaker 52 may be configured to open the connection between AC input cable 50 and AC input 12 if the input AC power exceeds the capacity of power supply 10. In some embodiments, power supply 10 has a maximum rated capacity of 600 VA. Breaker 52 may be replaced with a slow blow fuse in some embodiments.

In operation, a user connects the external AC power source to AC input 12. The user then turns on power supply 10 by pressing button 46 and holding it for at least 3 seconds, which causes charger 26 to provide power from battery 22 to controller 25 through power source 23. When controller 25 begins receiving power, it sends an enable signal to charger 26 so that charger 26 continues to provide power to controller 25. Controller may also cause charger 26 to send an enable signal to DC/DC regulator 36.

Controller 25 then determines whether suitable AC power is being received at AC input 12. Suitable AC power may include, for example, AC power with a voltage of within ±25% of the nominal power (typically 120V or 220V), and a frequency of within ±10% of the nominal frequency (typically 50 Hz or 60 Hz).

If suitable AC power is being received at AC input 12, controller 25 closes backfeed relay 16, and AC power is provided to AC output 34 and first winding L1. This mode of operation is sometimes referred to as "line normal" mode. Rectifier 35 receives AC power from fourth winding L4, and provides DC power to DC output 38 through DC/DC regulator 36. Charger 26 receives AC power from third winding L3, and provides DC power to charge battery 22.

If suitable AC power is not being received at AC input 12, controller 25 opens backfeed relay 16 and causes inverter 24 to draw current from battery 22 and operate in push-pull fashion (i.e., alternately connecting the battery to the first and second end taps of second winding L2) in order to produce an AC current in second winding L2. This mode of operation is sometimes referred to as "backup" mode. AC output 34 receives AC power from first winding L1. Rectifier 35 receives DC power from fourth winding L4, and provides DC power to DC output 38 through DC/DC regulator 36.

Controller 25 may also monitor the voltage of AC power received at AC input 12, as well as the AC power provided to AC output 34. Controller 25 may also monitor the DC power provided to DC output 38.

Controller 25 may compensate for fluctuations in the voltage of AC power at AC input 12 and AC output 34 by appropriate selection of the positions of voltage regulating relays 18. For example, if the voltage at AC input exceeds the nominal voltage, controller 25 may cause input voltage regulation relay 18A to be in the second position, such that backfeed relay 16 is connected across the first end tap and the intermediate tap of first winding L1.

Controller 25 may be coupled to AC output 34 and DC output 38 in order to monitor the total power drawn from power supply 10 by the connected loads. Controller 25 causes power supply 10 to shut down if the total power drawn by the loads exceeds 110% of the nominal power for 60 seconds, or exceeds 130% of the nominal power for 3 seconds. Controller 25 may also cause alarm 27 to emit an overload alarm, as described below.

Power supply 10 may be configured to automatically perform a self-test when its power is turned on. A user may also trigger a self-test by pressing button 46 for less than one second. During a self-test, power supply 10 attempts to operate the loads with power drawn from battery 22. If power supply fails the self-test, LED 44 remains solid, indicating to the user that power supply 10 was not able to supply power from battery 22. If power supply 10 is able to supply power from battery 22, this causes LED 44 to flash every two seconds, indicating to the user that power supply 10 is operational. During the self-test, controller 25 may also determine the charge stored in battery 22 by querying charger 26, and provide a low battery warning to the user if a low battery condition exists. After the self-test is complete, power supply 10 returns to line normal operation, and LED 44 stops flashing and remains lit.

In the illustrated example, the transfer time, that is, the time between a loss of suitable AC power from the external AC power source and the time at which battery 22 begins supplying backup power to the loads, is approximately 2 to 4 milliseconds. This transfer time includes the time it takes for controller 25 to detect a problem with the AC power received at AC input 12. In some embodiments, power supply 10 can supply backup power for 20 to 30 minutes, depending on the load(s) connected to power supply 10.

In backup mode, power supply 10 may be configured to automatically shut down after a predetermined time if the connected loads are drawing less than a predetermined amount of power for a predetermined amount of time. For example, if the connected loads are drawing less than 25 watts during backup mode, power supply 10 may automatically shut down after 5 minutes in order to conserve battery power. Power supply 10 will also enter shut down mode when the power in battery 22 has been exhausted. Controller 25 may cause power supply 10 to enter shut down mode by turning off inverter 24 and causing charger 26 to send a disable signal to DC/DC regulator 36. In shut down mode, power supply 10 will stop supplying power to the loads until the return of power from the external AC power source.

Alarm 27 (see FIG. 1) may emits sounds under the control of controller 25 during certain operating conditions. When power supply 10 is in backup mode, alarm 27 emits a backup alarm. The backup alarm may be a beep which repeats about once every two seconds. The backup alarm stops when power supply 10 returns to line normal operation. A user may also silence the backup alarm by pressing button 46.

When the energy stored in battery 22 decreases below a predetermined level while power supply 10 is in backup mode, alarm 27 emits a low battery alarm. The low battery alarm may be a beep which repeats about twice every second. The low battery alarm stops when power supply 10 returns to line normal operation, or when power supply 10 shuts down due to battery exhaustion.

When power supply 10 is overloaded, alarm 27 emits an overload alarm. The overload alarm may be a continuous beep. The overload alarm does not stop until power supply 10 is no longer overloaded or until the overload causes power supply 10 to shut down as described above.

When battery 22 needs to be replaced, alarm emits a battery replacement alarm. The battery replacement alarm may also be a continuous beep.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A power supply for providing alternating current (AC) and direct current (DC) to a plurality of loads, the power supply comprising:
   a transformer having first, second, third and fourth windings;
   an AC input for receiving AC power from an external source, the AC input connected across the first winding through a backfeed relay;
   an AC output connected across the first winding and connected to the AC input through the backfeed relay;
   an inverter connected across the second winding;
   a pair of battery terminals connected between the inverter and a center tap of the second winding;
   a charger connected across the third winding, the charger coupled to the pair of battery terminals;
   a rectifier connected across the fourth winding;
   a DC output connected to the rectifier through a DC/DC regulator; and,
   a controller coupled to the AC input, the backfeed relay, the inverter and the charger,
   wherein when AC power is received at the AC input the power supply operates in a normal mode wherein the controller closes the backfeed relay such that:
   the AC output receives AC power from the AC input through the backfeed relay;
   the rectifier receives AC power from the AC input through the backfeed relay and the transformer; and,
   the DC output receives DC power from the rectifier through the DC/DC regulator,
   and when AC power is not received at the AC input the power supply operates in a backup mode wherein the controller opens the backfeed relay and causes the inverter to operate in push-pull fashion such that:
   DC power received at the pair of battery terminals is converted to AC power and provided to the second winding through the inverter;
   the AC output receives AC power through the transformer;
   the rectifier receives AC power through the transformer; and,
   the DC output receives DC power from the rectifier through the DC/DC regulator.

2. A power supply according to claim 1 comprising a battery connected between the pair of battery terminals.

3. A power supply according to claim 1 wherein a first terminal of the backfeed relay and a first terminal of the AC output are connected to a first end tap of the first winding, the power supply comprising an input voltage regulation relay connected between a second terminal of the backfeed relay and the first winding and an output voltage regulation relay connected between the first winding and a second terminal of the AC output.

4. A power supply according to claim 3 wherein the input and output voltage regulation relays are each moveable between a first position and a second position under control of the controller, the first positions of the input and output voltage regulation relays connected to an second end tap of the first winding and the second positions of the input and output voltage regulation relays connected to an intermediate tap of the first winding.

5. A power supply according to claim 1 wherein the DC/DC regulator provides constant DC power to the DC output at +24 V and 1.5 A.

6. A power supply according to claim 1 wherein the AC input is configured to receive AC power with a voltage of 120V.

7. A power supply according to claim 1 wherein the AC input is configured to receive AC power with a voltage of 220V.

8. A power supply according to claim 1 comprising a surge protector connected between the AC input and the backfeed relay.

9. A power supply according to claim 1 comprising a surge protector connected between the AC output and the first winding.

10. A power supply according to claim 1 wherein the controller is configured to shut down the power supply if a triggering event occurs.

11. A power supply according to claim 10 wherein the triggering event occurs when connected loads draw more than a predetermine amount of power from the power supply for a predetermined period of time.

12. A power supply according to claim 10, wherein the triggering event occurs when connected loads draw less than a predetermined amount of power from the power supply for a predetermined period of time during backup mode.

13. A power supply according to claim 1 comprising an alarm mechanism which sounds a first alarm during backup mode.

14. A power supply according to claim 13 wherein the alarm mechanism sounds a second alarm when the battery is below a predetermined charge level.

15. A power supply according to claim 14 wherein the alarm mechanism sounds a third alarm when the power supply is overloaded or the battery needs replacement.

16. A power supply according to claim 1 comprising a LED which is continuously lit during normal mode, flashes at a first frequency during backup mode, and flashes at a second frequency when a battery connected between the pair of battery terminals needs replacement.

17. A power supply according to claim 1 wherein the power supply enters backup mode within between 2 and 4 milliseconds of the occurrence of a problem with the AC power from the external source.

* * * * *